US009367446B2

United States Patent
Lin et al.

(10) Patent No.: US 9,367,446 B2
(45) Date of Patent: Jun. 14, 2016

(54) COMPUTER SYSTEM AND DATA RECOVERY METHOD FOR A COMPUTER SYSTEM HAVING AN EMBEDDED CONTROLLER

(71) Applicant: Wistron Corporation, New Taipei (TW)

(72) Inventors: Wen-Tai Lin, New Taipei (TW); Min-Hsien Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 188 days.

(21) Appl. No.: 14/010,559

(22) Filed: Aug. 27, 2013

(65) Prior Publication Data

US 2014/0143477 A1  May 22, 2014

(30) Foreign Application Priority Data

Nov. 19, 2012  (TW) .............................. 101143145 A

(51) Int. Cl.
| | | |
|---|---|---|
| G06F 3/00 | (2006.01) | |
| G06F 9/00 | (2006.01) | |
| G06F 15/177 | (2006.01) | |
| G06F 12/02 | (2006.01) | |
| G06F 11/14 | (2006.01) | |
| G06F 9/44 | (2006.01) | |
| G06F 13/16 | (2006.01) | |

(52) U.S. Cl.
CPC .......... G06F 12/0246 (2013.01); G06F 9/4418 (2013.01); G06F 11/1441 (2013.01); G06F 13/16 (2013.01)

(58) Field of Classification Search
None
See application file for complete search history.

(56) References Cited

U.S. PATENT DOCUMENTS

| | | | | |
|---|---|---|---|---|
| 6,052,793 | A * | 4/2000 | Mermelstein | 713/340 |
| 6,272,630 | B1 * | 8/2001 | Chen et al. | 713/2 |
| 6,901,298 | B1 * | 5/2005 | Govindaraj et al. | 700/21 |
| 7,672,934 | B1 * | 3/2010 | Beatty et al. | 707/999.003 |
| 2003/0086683 | A1 * | 5/2003 | Morisawa | 386/46 |
| 2004/0030877 | A1 | 2/2004 | Frid | |
| 2005/0182797 | A1 | 8/2005 | Adkins et al. | |
| 2008/0288557 | A1 * | 11/2008 | Chiu | 707/202 |
| 2009/0019278 | A1 * | 1/2009 | Shah et al. | 713/100 |
| 2009/0043916 | A1 | 2/2009 | Schramm et al. | |
| 2010/0202237 | A1 | 8/2010 | Moshayedi et al. | |

(Continued)

FOREIGN PATENT DOCUMENTS

| | | |
|---|---|---|
| TW | 181364 | 4/1992 |
| TW | 200528969 | 9/2005 |

(Continued)

OTHER PUBLICATIONS

"Office Action of Taiwan Counterpart Application," issued on Feb. 9, 2015, with English translation thereof, p. 1-p. 10.

Primary Examiner — David E Martinez
(74) Attorney, Agent, or Firm — Jianq Chyun IP Office

(57) ABSTRACT

A computer system and a data recovery method are provided. The computer system includes an embedded controller (EC). The data recovery method includes following steps. When the computer system stores data into the EC through a basic input/output system (BIOS), the data is backed up into a non-volatile random access memory (NVRAM) by the BIOS. The EC enters a power-off mode. The data is obtained from the NVRAM and is stored back to the EC after the EC leaves the power-off mode. Accordingly, the EC recovers from the power-off mode.

19 Claims, 2 Drawing Sheets

(56) References Cited

U.S. PATENT DOCUMENTS

| | | |
|---|---|---|
| 2010/0202238 A1 | 8/2010 | Moshayedi et al. |
| 2010/0202239 A1 | 8/2010 | Moshayedi et al. |
| 2010/0202240 A1 | 8/2010 | Moshayedi et al. |
| 2010/0205348 A1 | 8/2010 | Moshayedi et al. |
| 2010/0205349 A1 | 8/2010 | Moshayedi et al. |
| 2010/0205470 A1 | 8/2010 | Moshayedi et al. |
| 2011/0252225 A1* | 10/2011 | Liu et al. .......... 713/2 |
| 2013/0326206 A1* | 12/2013 | Lueck et al. ....... 713/2 |

FOREIGN PATENT DOCUMENTS

| | | |
|---|---|---|
| TW | 200907688 | 2/2009 |
| TW | 201106371 | 2/2011 |

* cited by examiner

COMPUTER SYSTEM AND DATA RECOVERY METHOD FOR A COMPUTER SYSTEM HAVING AN EMBEDDED CONTROLLER

CROSS-REFERENCE TO RELATED APPLICATION

This application claims the priority benefit of Taiwan application serial no. 101143145, filed on Nov. 19, 2012. The entirety of the above-mentioned patent application is hereby incorporated by reference herein and made a part of this specification.

BACKGROUND

1. Technical Field

The invention relates to an electronic apparatus. Particularly, the invention relates to a data recovery method and a computer system using the data recovery method.

2. Related Art

Generally, a computer system may include an embedded controller (EC). The EC can store data or settings, and provide one or a plurality of functions to peripheral devices or a board controlling the computer system according to the data or the settings. However, in some cases, such EC only includes a volatile memory and does not have a non-volatile random access memory (NVRAM). Therefore, when the EC enters a power-off mode (which is also referred to as an S5 mode or a G3 state), since the power of the EC is removed, data stored in the volatile memory is lost. When the EC is recovered from the power-off mode, i.e. the power is again supplied to the EC, since the data stored in the volatile memory has been lost, the EC cannot normally provide related functions. Therefore, it is an important issue concerned by related technicians to recover the EC from the power-off mode in case that the EC only has the volatile memory and does not have the non-volatile memory, the volatile memory is insufficient, or the EC does not have an in-built real-time clock function.

SUMMARY

The invention is directed to a data recovery method and a computer system, by which an embedded controller is capable of being recovered from a power-off mode.

An embodiment of the invention provides a data recovery method, which includes following steps. When a computer system stores data into an embedded controller through a basic input/output system (BIOS), the data is backed up into a non-volatile random access memory (NVRAM) of the BIOS. The embedded controller enters a power-off mode. The data is obtained from the NVRAM and is stored back to the embedded controller after the embedded controller leaves the power-off mode.

In an embodiment of the invention, the step of storing the data back to the embedded controller includes following steps. The embedded controller activates the computer system. The embedded controller obtains the data from the NVRAM through the BIOS. The computer system is turned off by the BIOS or the embedded controller after the data is obtained.

In an embodiment of the invention, the step of storing the data back to the embedded controller includes following steps. The embedded controller sends a request to the BIOS, and the BIOS transmits the data back to the embedded controller according to the request.

In an embodiment of the invention, the step of storing the data back to the embedded controller includes following steps. The embedded controller activates the computer system. The BIOS performs initialisation and sends an inquiry message to the embedded controller to inquire whether to store back the data. The embedded controller sends a reply to the BIOS according to the inquiry message. The BIOS stores the data back to the embedded controller according to the reply.

In an embodiment of the invention, the step of storing the data back to the embedded controller includes following steps. The BIOS detects whether the data in the embedded controller is consistent with the data backed up to the NVRAM. If the data in the embedded controller is not consistent with the data backed up to the NVRAM, the BIOS actively stores the data back to the embedded controller.

In an embodiment of the invention, the data recovery method further includes following steps. Real-time clock information is obtained from a clock unit of the computer system after the embedded controller leaves the power-off mode. The embedded controller uses the real-time clock information to simulate a real-time clock, so as to calculate or correct a current time.

In an embodiment of the invention, the embedded controller obtains the real-time clock information from the clock unit through the BIOS.

In an embodiment of the invention, the data includes a scheduled turn-on setting, and the data recovery method further includes activating the computer system at a specific time by the embedded controller according to the current time and the scheduled turn-on setting.

In an embodiment of the invention, the NVRAM further stores a firmware code or a configuration setting of the BIOS.

In an embodiment of the invention, the data recovery method further includes following steps. The embedded controller enters the power-off mode when a power of the computer system is removed. When the computer system sends a power-off command, the embedded controller enters the power-off mode according to the power-off command.

In an embodiment of the invention, the data recovery method further includes that the embedded controller leaves the power-off mode when power is supplied to the computer system.

An embodiment of the invention provides a computer system including a control unit, a non-volatile random access memory (NVRAM) and an embedded controller. The NVRAM is coupled to the control unit and stores a basic input/output system (BIOS), and the BIOS is executed by the control unit. The embedded controller is coupled to the control unit. When the computer system stores data into the embedded controller through the BIOS, the BIOS backs up the data into the NVRAM. The embedded controller enters a power-off mode. The data is obtained from the NVRAM and is stored back to the embedded controller after the embedded controller leaves the power-off mode.

In an embodiment of the invention, during the operation of storing the data back to the embedded controller, the embedded controller activates the computer system, and obtains the data from the NVRAM through the BIOS. After the data is obtained, the BIOS or the embedded controller turns off the computer system.

In an embodiment of the invention, during the operation of storing the data back to the embedded controller, the embedded controller sends a request to the BIOS, and the BIOS transmits the data back to the embedded controller according to the request.

In an embodiment of the invention, during the operation of storing the data back to the embedded controller, the embedded controller activates the computer system, and the BIOS performs initialisation and sends an inquiry message to the embedded controller to inquire whether to store back the data. The embedded controller sends a reply to the BIOS according to the inquiry message, and the BIOS stores the data back to the embedded controller according to the reply.

In an embodiment of the invention, the BIOS detects whether the data in the embedded controller is consistent with the data backed up to the NVRAM. If the data in the embedded controller is not consistent with the data backed up to the NVRAM, the BIOS actively stores the data back to the embedded controller.

In an embodiment of the invention, after the embedded controller leaves the power-off mode, it obtains real-time clock information from a clock unit of the computer system. The embedded controller uses the real-time clock information to simulate a real-time clock, so as to calculate or correct a current time.

In an embodiment of the invention, the embedded controller obtains the real-time clock information from the clock unit through the BIOS.

In an embodiment of the invention, the data includes a scheduled turn-on setting. The embedded controller activates the computer system at a specific time according to the current time and the scheduled turn-on setting.

In an embodiment of the invention, the embedded controller enters the power-off mode when a power of the computer system is removed. When the computer system sends a power-off command, the embedded controller enters the power-off mode according to the power-off command.

In an embodiment of the invention, the embedded controller leaves the power-off mode when the power is supplied to the computer system.

According to the above descriptions, in the data recovery method and the computer system of the invention, the data transmitted to the embedded controller is backed up in the NVRAM, such that the embedded controller can be recovered from the power-off mode.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
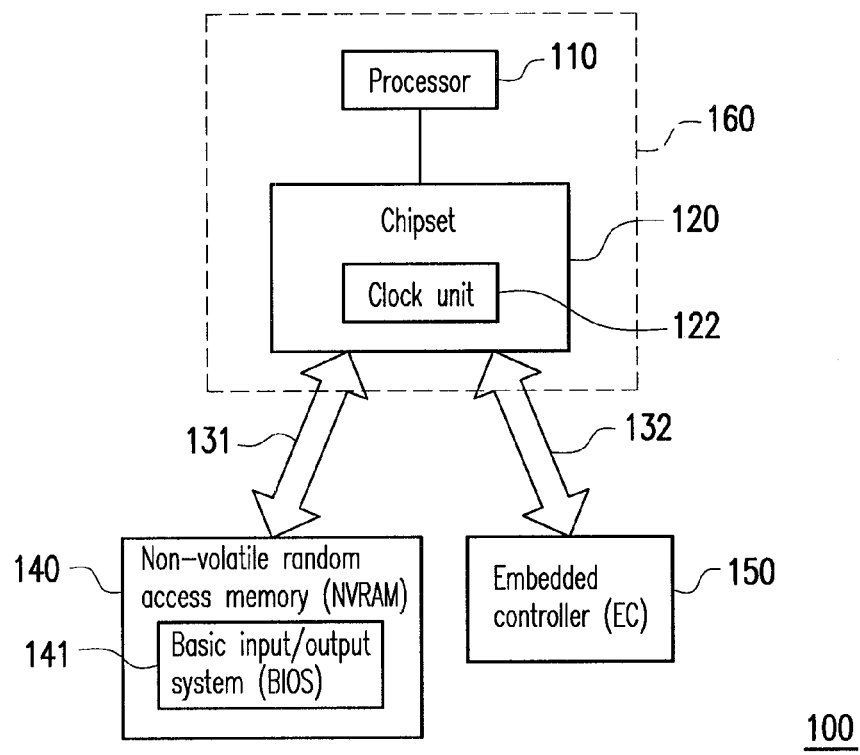
FIG. 1 is a partial circuit block schematic diagram of a computer system according to a first embodiment of the invention.

FIG. 1 is a partial circuit block schematic diagram of a computer system 100 according to a first embodiment of the invention. The computer system 100 includes a control unit 160, a transmission interface 131, a transmission interface 132, a non-volatile random access memory (NVRAM) 140 and an embedded controller (EC) 150. The control unit 160 can be any type of a control circuit capable Of executing a basic input/output system (BIOS). For example, the computer system 100 can be implemented as a notebook computer, a personal computer (PC), a tablet PC or a server, and the control unit 160 may include a processor 110 and a chipset 120. In another embodiment, the processing unit 110 and the chipset 120 can be integrated to a same integrated circuit (IC) to form the control unit 160.

The processor 110 may execute one or a plurality of program codes, for example, program codes of an operating system OS and/or firmware codes of the BIOS 141 to control a whole operation of the computer system 100. For example, the processor 110 is a central processing unit (CPU), a microprocessor or other processing/control circuit capable of executing the program codes.

The chipset 120 is coupled to the processor 110 to serve as a transmission interface between other peripheral devices (for example, a graphics card, a memory or a network card) and the processor 110. For example, the chipset 120 is a platform controller hub (PCH), a north bridge chip, a south bridge chip or a combination thereof. In the present embodiment, the chipset 120 has a clock unit 122, which is used to provide real-time clock (RTC) information. In other embodiments, the clock unit 122 can be configured in other chips outside the chipset 120, and the chipset 120 can access the real-time clock information of the clock unit 120 through a bus.

The NVRAM 140 is coupled to the chipset 120 through the transmission interface 131. The transmission interface 131 can be any type of a data transmission interface, for example, a serial peripheral interface (SPI), a low pin count (LPC) bus or other data transmission interface. The NVRAM 140 stores firmware codes and/or configuration settings of the BIOS 141. The NVRAM 140 can be a memory circuit capable of storing data by any means, in which the stored data is not lost when the system is power-off. In the present embodiment, the NVRAM 140 is a flash memory. In another embodiment, the NVRAM 140 can also be an electrically-erasable programmable read-only memory (EEPROM) or other type of read-only memory, which is not limited by the invention. In the other embodiment, the NVRAM 140 includes a complementary metal-oxide semiconductor (CMOS) read-write memory. The CMOS read-write memory can be a read-write RAM chip on a motherboard, which saves hardware configuration information and parameters of user settings of the current system. The CMOS read-write memory is powered by a battery on the motherboard, such that even if the system is power-off, the stored data is not lost. In following descriptions, when operations of the BIOS 141 are described, it represents operations performed when the processor 110 executes the firmware codes in the BIOS 141, which is not repeated in following descriptions.

The EC 150 is coupled to the chipset 120 through the transmission interface 132. The transmission interface 132 can be any type of data transmission interface. For example, the transmission interface 132 can be a data transmission interface complied with LPC bus, inter-integrated circuit ($I^2C$) or other transmission specifications. In some embodiments, the transmission interface 131 and the transmission interface 132 can be the same interface circuits. In some other embodiments, the transmission interface 131 and the transmission interface 132 can be different interface circuits. Moreover, the transmission interface 131 and the transmission interface 132 can be complied with the same specification or different specifications. When the transmission interface 131 and the transmission interface 132 are complied with the same specification, the transmission interface 131 and the transmission interface 132 can be integrated into a same transmission interface (for example, the chipset 120, the EC 150 and the NVRAM 140 are all coupled to a same LPC bus). Specifications of the transmission interface 131 and the transmission interface 132 are not limited by the invention.

In an embodiment, the EC 150 can be a keyboard controller (KBC), a baseboard management controller (BMC) or other controllers. In the present embodiment, the EC 150 includes an internal RAM, which is used for storing data or program codes. The EC 150 can provide one or a plurality of functions to the computer system 100 and/or other peripheral devices according to the data or the program codes. For example, in some embodiments, the EC 150 can provide a scheduled power on/off function to the computer system 100. However, when the EC 150 enters a power-off mode (which is also referred to as an S5 mode or a G3 mode), data in the internal RAM of the EC 150 is lost. Therefore, before the power is turned off, the data in the EC 150 is backed up to the NVRAM 140. After the EC 150 leaves the power-off mode, it reads the data from the NVRAM to recover the data of the internal RAM.

In detail, when the computer system 100 is power-on and operates, the computer system 100 can store data (for example, configuration information, user setting information or other data) in the EC 150 through the BIOS 141. The EC 150 can provide one or a plurality of functions according to the data. When the computer system 100 stores data to the EC 150 through the BIOS 141, the BIOS 141 backs up the data to the NVRAM 140. For example, the data includes a scheduled turn-on setting, which is used to instruct the EC 150 to activate the computer system 100 at a specific time. In another embodiment, the computer system 100 can store settings of peripheral devices, settings of turn on/off time or related data to the EC 150 through the BIOS 141, and data content stored to the EC 150 is not limited by the invention. In the present embodiment, the BIOS 141 transmits the data to the EC 150 through the transmission interface 132 (complied with the I²C specification). In another embodiment, the BIOS 141 can also transmit data to the EC 150 through memory-mapped I/O), which is not limited by the invention. Moreover, the BIOS 141 can store the data to the EC 150 during a booting period, an operation period of the operating system, a turning off period or a hibernation mode period, which is not limited by the invention.

In an embodiment, the BIOS 141 regularly/irregularly detects whether the data stored in the EC 150 is consistent with the data backed up in the NVRAM 140. If the data stored in the EC 150 is not consistent with the data backed up in the NVRAM 140, the BIOS 141 actively stores the data backed up in the NVRAM 140 back to the EC 150.

In case that the power of the computer system 100 is not removed, after the computer system 100 is turned off, a standby power of the computer system 100 is provided to the EC 150 to keep the data stored in the EC 150. In the present embodiment, the user turns off the computer system. However, in another embodiment, the EC 150 can be used to turn off the computer system 100, which is not limited by the invention. When the power (includes city power and battery) of the computer system 100 is removed, the EC 150 enters the power-off mode, and the data stored in the EC 150 is lost. It should be noticed that when the power of the computer system 100 is recovered and the EC 150 leaves the power-off mode, the EC 150 obtains the backed up data from the NVRAM 140, and the data is stored back to the EC 150. In this way, the EC 150 can execute a specific function according to the data.

In the present embodiment, the EC 150 obtains the data backed up in the NVRAM 140 through the BIOS 141. For example, after the EC 150 leaves the power-off mode, the EC 150 activates the computer system 100 (which refers to activate a hardware system other activating a general operating system to enter a state suitable for the user to operate the computer), and sends a request to the BIOS 141. The BIOS 141 transmits the data backed up in the NVRAM 140 back to the EC 150 according to the request.

Alternatively, after the EC 150 leaves the power-off mode, the EC 150 activates the computer system 100 (which is also refers to the hardware system), and the BIOS 141 performs an initialisation operation and sends an inquiry message to the EC 150 to inquire whether to store back the backed up data. If the EC 150 determines to store back the backed up data, it sends a reply to the BIOS 141 according to the inquiry message. Then, the BIOS 141 stores the data backed up in the NVRAM 140 back to the EC 150 according to the reply.

Figure 2:
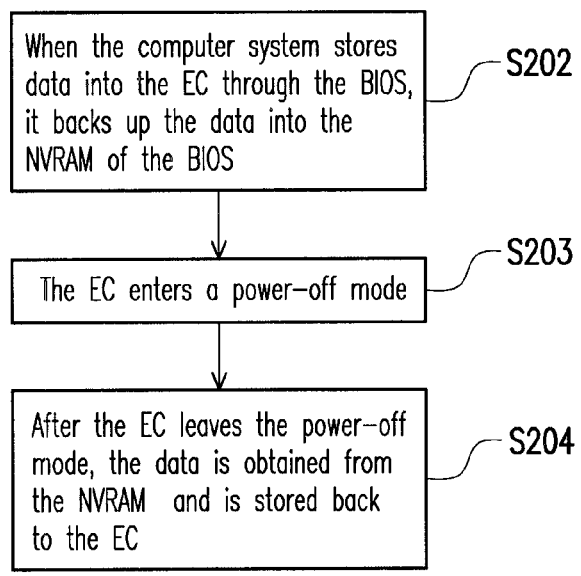
FIG. 2 is a flowchart illustrating a data recovery method of an embedded controller according to the first embodiment of the invention.

FIG. 2 is a flowchart illustrating a data recovery method of the EC 150 according to the first embodiment of the invention. Referring to FIG. 1 and FIG. 2, in step S202, when the computer system 100 stores data into the EC 150 through the BIOS 141, it backs up the data into the NVRAM 140 of the BIOS 141. In step S203, the EC 150 enters the power-off mode. In step S204, after the EC 150 leaves the power-off mode, the data is obtained from the NVRAM 140 and is stored back to the EC 150. The steps of FIG. 2 have been described in detail above, which are not repeated.

Second Embodiment

The second embodiment is similar to the first embodiment, and only differences there between are described below. The second embodiment can be deduced with reference of related descriptions of the first embodiment. In the second embodiment, besides that the power (including city power and battery) of the computer system 100 is removed to enter the power-off mode, the EC 150 can also enter the power-off mode for saving electric power.

Figure 3:
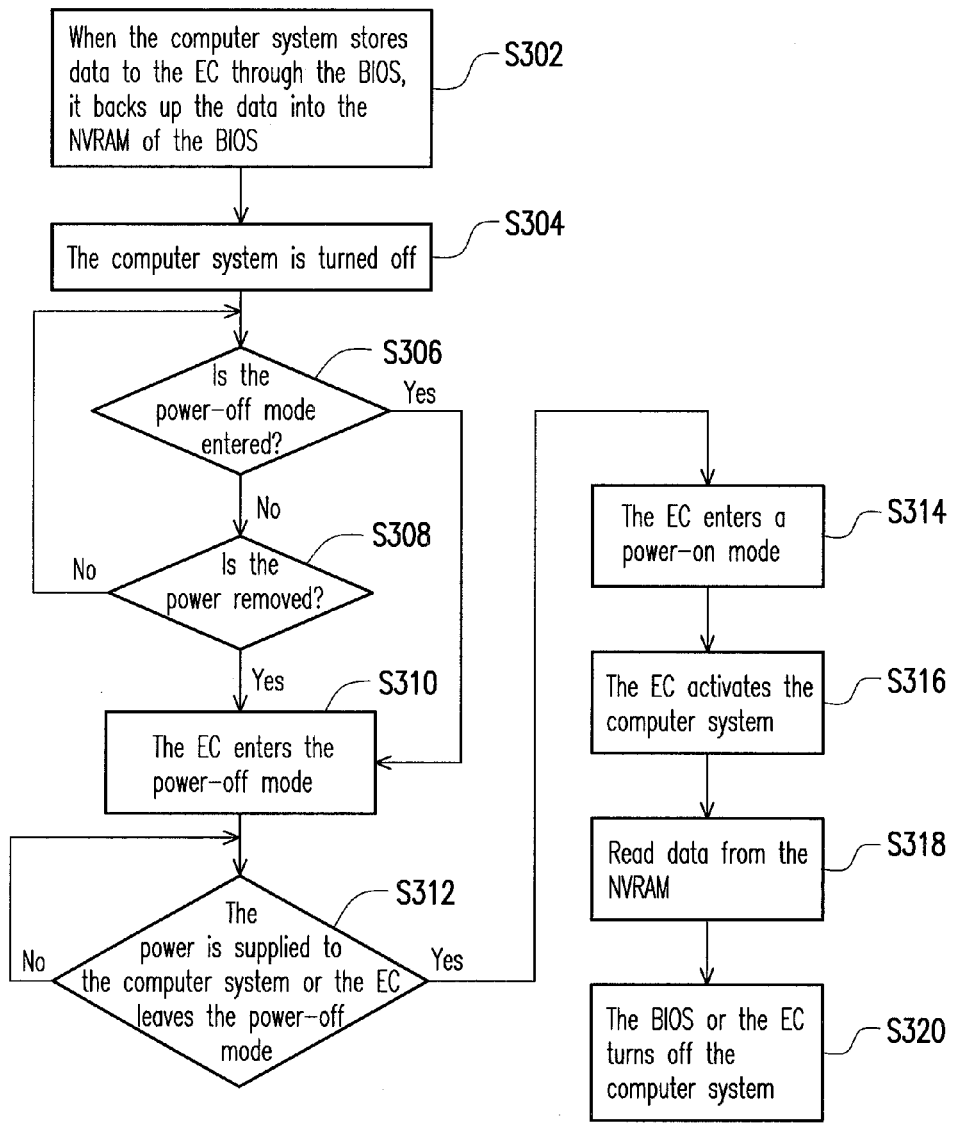
FIG. 3 is a flowchart illustrating a data recovery method of an embedded controller according to a second embodiment of the invention.

FIG. 3 is a flowchart illustrating a data recovery method of the EC 150 according to the second embodiment of the invention. Referring to FIG. 1 and FIG. 3, in step S302, when the computer system 100 stores data to the EC 150 through the BIOS 141, it backs up the data into the NVRAM 140 of the BIOS 141. The step S302 is the same to the step S202, and related descriptions thereof can be cross-referred, which are not repeated.

In step S304, the computer system 100 is turned off. The step S304 generally refers to normal turn-off and abnormal turn-off. In case that the power (for example, city power or battery) of the computer system 100 is not removed, after the computer system 100 is turned off, the standby power of the computer system 100 is provided to the EC 150 and a few other components.

In step S306, the EC 150 determines whether to enter the power-off mode. For example, if the computer system 100 sends a power-off command, the EC 150 enters the power-off mode according to the power-off command. Alternatively, the EC 150 can determine whether to enter the power-off mode according to capacity of the battery on the computer system 100, which is not limited by the invention. In the step S306, if it is determined that the EC 150 is required to enter the power-off mode, the EC 150 enters the power-off mode (step S310).

In the step S306, if it is determined that the EC 150 does not enter the power-off mode, in step S308, the EC 150 determines whether the power on the computer system 100 is removed. If the power (including city power and battery) on the computer system 100 is removed, the EC 150 enters the power-off mode (step S310). It should be noticed that the power mentioned in the step S308 is an alternating current (AC) power or a direct current (DC) power. For example, the computer system 100 is a notebook computer, and the AC power is supplied by the city power through an adapter, and the DC power is supplied by a battery in the computer system 100. When the AC power and the DC power are all removed form the computer system 100, the EC 150 enters the power-off mode. Alternatively, if only the AC power is removed, the EC 150 executes the step S306, and determines whether the AC power has been removed for a predetermined time (for example, 30 minutes). When the AC power has been removed for more than the predetermined time, the EC 150 also enters the power-off mode (step S310).

In step S312, it is determined whether the power (for example, the AC power) has been supplied to the computer system 100 or the EC 150 leaves the power-off mode. If a determination result of the step S312 is negative, the step S312 is continually executed, i.e. the EC 150 continually keeps the power-off mode.

If the power has been supplied to the computer system or the EC 150 leaves the power-off mode, in step S314, the EC 150 enters a power-on mode (which is also referred to as an S0 mode or a G0 state).

In step S316, the EC 150 activates the computer system 100 (which is also referred to the hardware system). It should be noticed that a screen (not shown) on the computer system 100 is not activated, and the operating system is also not activated, so that the user cannot discover that the hardware system of the computer system 100 has been activated.

In the step S318, the EC 150 obtains data previously backed up in the NVRAM 140. For example, the EC 150 obtains the data backed up in the NVRAM 140 through the BIOS 141.

In step S320, after the EC 150 obtains the data, the EC 150 or the BIOS 141 turns off the computer system 100. It should be noticed that the steps S314, S316, S318 and S320 are completed within a very short time (for example, within 1 second). Therefore, the user cannot notice that the computer system 100 is ever activated and turned off. However, after the step S320 is completed, the EC 150 can execute a specific function according to the data read from the NVRAM 140. For example, if the EC 150 does not have the clock unit capable of providing the real-time clock, the EC 150 obtains the scheduled turn-on setting from the NVRAM 140, and obtains the real-time clock information from the clock unit 122 of the chipset 120 through the BIOS 141. The EC 150 uses the obtained real-time clock information to simulate a real-time clock, so as to calculate or correct a current time. Then, the EC 150 activates the computer system 100 at a specific time according to the current time and the scheduled turn-on setting. For example, when it is determined that the current time is the same to the specific time, the EC 150 activates the computer system 100.

In summary, according to the computer system and the dada recovery method of the invention, the EC can be recovered from the power-off mode for providing related functions in case that the EC only has the volatile memory and does not have the non-volatile memory, the volatile memory is insufficient, or the EC does not have an in-built real-time clock function, and the user will not notice that the computer system is ever activated, temporarily.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data recovery method for a computer system having an embedded controller, comprising:
   when the computer system stores data into the embedded controller through a basic input/output system (BIOS), backing up the data into a non-volatile random access memory (NVRAM) storing the BIOS;
   the embedded controller entering a power-off mode; and
   obtaining the data from the NVRAM and storing the data back to the embedded controller after the embedded controller leaves the power-off mode;
   wherein the step of storing the data back to the embedded controller comprises: activating the computer system by the embedded controller; obtaining the data from the NVRAM by embedded controller through the BIOS; and turning off the computer system by the BIOS or the embedded controller after the data is obtained.

2. The data recovery method as claimed in claim 1, wherein the step of storing the data back to the embedded controller comprises:
   sending a request to the BIOS by the embedded controller; and
   transmitting the data back to the embedded controller by the BIOS according to the request.

3. The data recovery method as claimed in claim 1, wherein the step of storing the data back to the embedded controller comprises:
   activating the computer system by the embedded controller;
   performing initialisation by the BIOS and sending an inquiry message to the embedded controller to inquire whether to store back the data;
   sending a reply to the BIOS by the embedded controller according to the inquiry message; and
   storing the data back to the embedded controller by the BIOS according to the reply.

4. The data recovery method as claimed in claim 1, wherein the step of storing the data back to the embedded controller comprises:
   detecting whether the data in the embedded controller is consistent with the data backed up to the NVRAM by the BIOS; and
   actively storing the data back to the embedded controller by the BIOS when the data in the embedded controller is not consistent with the data backed up to the NVRAM.

5. The data recovery method as claimed in claim 1, further comprising:
   obtaining real-time clock information from a clock unit of the computer system after the embedded controller leaves the power-off mode;
   using the real-time clock information to simulate a real-time clock by the embedded controller, so as to calculate or correct a current time.

6. The data recovery method as claimed in claim 5, wherein the embedded controller obtains the real-time clock information from the clock unit through the BIOS.

7. The data recovery method as claimed in claim 5, wherein the data comprises a scheduled turn-on setting, and the data recovery method further comprises:

activating the computer system at a specific time by the embedded controller according to the current time and the scheduled turn-on setting.

8. The data recovery method as claimed in claim 1, wherein the NVRAM further stores a firmware code or a configuration setting of the BIOS.

9. The data recovery method as claimed in claim 1, further comprising:

the embedded controller entering the power-off mode if a power of the computer system is removed; and if the computer system sends a power-off command, the embedded controller entering the power-off mode according to the power-off command.

10. The data recovery method as claimed in claim 9, further comprising:

the embedded controller leaving the power-off mode if the power is supplied to the computer system.

11. A computer system, comprising:

a control unit;

a non-volatile random access memory (NVRAM), coupled to the control unit and storing a basic input/output system (BIOS), wherein the BIOS is executed by the control unit; and an embedded controller, coupled to the control unit, wherein when the computer system stores data into the embedded controller through the BIOS, the BIOS backs up the data into the NVRAM, wherein the embedded controller enters a power-off mode, and the data is obtained from the NVRAM and is stored back to the embedded controller after the embedded controller leaves the power-off mode;

wherein during the operation of storing the back to the embedded controller, the embedded controller activates the computer system, and obtains the data from the NVRAM through the BIOS, and after the datd is obtained, the BIOS or the embedded controller turns off the computer system.

12. The computer system as claimed in claim 11, wherein during the operation of storing the data back to the embedded controller, the embedded controller sends a request to the BIOS, and the BIOS transmits the data back to the embedded controller according to the request.

13. The computer system as claimed in claim 11, wherein during the operation of storing the data back to the embedded controller, the embedded controller activates the computer system, the BIOS performs initialisation and sends an inquiry message to the embedded controller to inquire whether to store back the data, the embedded controller sends a reply to the BIOS according to the inquiry message, and the BIOS stores the data back to the embedded controller according to the reply.

14. The computer system as claimed in claim 11, wherein the BIOS detects whether the data in the embedded controller is consistent with the data backed up to the NVRAM, if the data in the embedded controller is not consistent with the data backed up to the NVRAM, the BIOS actively stores the data back to the embedded controller.

15. The computer system as claimed in claim 11, wherein after the embedded controller leaves the power-off mode, the embedded controller obtains real-time clock information from a clock unit of the computer system, the embedded controller uses the real-time clock information to simulate a real-time clock, so as to calculate or correct a current time.

16. The computer system as claimed in claim 15, wherein the embedded controller obtains the real-time clock information from the clock unit through the BIOS.

17. The computer system as claimed in claim 15, wherein the data comprises a scheduled turn-on setting, the embedded controller activates the computer system at a specific time according to the current time and the scheduled turn-on setting.

18. The computer system as claimed in claim 11, wherein the embedded controller enters the power-off mode if a power of the computer system is removed, and if the computer system sends a power-off command, the embedded controller enters the power-off mode according to the power-off command.

19. The computer system as claimed in claim 18, wherein the embedded controller leaves the power-off mode if the power is supplied to the computer system.

* * * * *